US010187106B2

(12) United States Patent
Ahee et al.

(10) Patent No.: US 10,187,106 B2
(45) Date of Patent: Jan. 22, 2019

(54) PROTECTIVE COVER FOR A TABLET COMPUTER

(71) Applicant: Incipio, LLC, Irvine, CA (US)

(72) Inventors: Anthony Ahee, Grosse Pointe Shores, MI (US); John M. Schoenith, Hollywood, CA (US)

(73) Assignee: Incipio, LLC, Irvine, CA (US)

( * ) Notice: Subject to any disclaimer, the term of this patent is extended or adjusted under 35 U.S.C. 154(b) by 0 days.

(21) Appl. No.: 15/683,732

(22) Filed: Aug. 22, 2017

(65) Prior Publication Data

US 2017/0353209 A1 Dec. 7, 2017

Related U.S. Application Data

(63) Continuation of application No. 15/087,984, filed on Mar. 31, 2016, now Pat. No. 9,742,458.

(60) Provisional application No. 62/140,842, filed on Mar. 31, 2015.

(51) Int. Cl.
*H04M 1/00* (2006.01)
*H04B 1/3888* (2015.01)
*A45C 11/00* (2006.01)

(52) U.S. Cl.
CPC ............ *H04B 1/3888* (2013.01); *A45C 11/00* (2013.01); *A45C 2011/003* (2013.01); *A45C 2200/15* (2013.01)

(58) Field of Classification Search
CPC .............................. H04B 1/3888; A45C 11/00
USPC ......................................................... 455/575.8
See application file for complete search history.

(56) References Cited

U.S. PATENT DOCUMENTS 9,742,458 B2 * 8/2017 Ahee .................... H04B 1/3888
2014/0347814 A1 * 11/2014 Zaloom ................. G06F 1/1626
361/679.56

* cited by examiner

*Primary Examiner* — Sanh D Phu
(74) *Attorney, Agent, or Firm* — Manatt, Phelps & Phillips, LLC

(57) ABSTRACT

A protective cover for a tablet computer is disclosed, which comprises a back cover and a front cover. The front cover includes an input side and a connector including a planar portion and a coupler for removably connecting the front cover to the back cover. The planar portion engages at least portion of a front surface of the tablet computer and the coupler engages an edge of the back cover.

20 Claims, 5 Drawing Sheets

1

PROTECTIVE COVER FOR A TABLET COMPUTER

RELATED APPLICATIONS

This application is a continuation of U.S. application Ser. No. 15/087,984, filed Mar. 31, 2016 and issued as U.S. Pat. No. 9,742,458 on Aug. 22, 2017, which claims the benefit of priority to U.S. Provisional Application No. 62/140,842, filed Mar. 31, 2015. The above applications are hereby incorporated herein by reference in their entirety and are to be considered a part of this specification.

FIELD

The present teachings relate to a cover for a computer, and more particularly, to a protective cover including a detachable keyboard for a tablet computer.

BACKGROUND

The present teachings are predicated upon providing an improved protective cover for a tablet computer. While promoting portability, some tablet computers can be difficult to grasp and hold, which can lead to damage especially during handling and transporting. Accordingly, protective covers were introduced to protect the tablet computer from damage. For example, a folio-style protective cover can be folded into a closed position to protect at least one side of the tablet computer; however, other parts of the tablet computer can be left exposed and can be susceptible to damage during handling or transporting. Most tablet computers offer a virtual on-screen keyboard for data input; however, typing on a virtual keyboard can be difficult and cumbersome, especially during prolonged periods. While various external keyboards are available for tablet computers, external keyboards may negate the portability advantage of a tablet computer.

Some protective covers have attempted to integrate a keyboard with a protective cover; however, disadvantages still exist. For example, some integrated keyboards are not separable from the protective cover or the tablet computer, which can undesirably limit versatility of the tablet computer. While some protective covers attempted to provide a detachable integrated keyboard, detaching and subsequently attaching some integrated keyboards can be cumbersome. Moreover, certain protective covers that include integrated keyboards that only allow the integrated keyboard to be used in a single, flat configuration or placed flat on a support surface, which can make typing uncomfortable and cumbersome, especially when used for prolonged periods.

In view of the above, it may be desirable to provide an improved protective cover for a tablet computer. It may be desirable to provide a protective cover for a tablet computer that can protect all surfaces and edges of the tablet computer. It may be attractive to provide a protective cover with an integrated keyboard that can be quickly and easily detached and attached to the protective cover, tablet computer, or both. It may be attractive to have a protective cover with an integrated, detachable keyboard for a tablet computer that can provide for the tablet computer to be used in a variety of configurations. It may be advantageous to provide a protective cover and integrated keyboard for a tablet computer where the integrated keyboard can be angularly positioned on a support surface. It would be desirable to provide an improved cover for a tablet computer that is lightweight, can be mass-produced relatively inexpensively, that has a minimal number of parts, and that is easy to operate.

SUMMARY

The present teachings meet one or more of these needs by providing an improved protective cover for a tablet computer. The present teachings also provide a protective cover for a tablet computer that can protect all surfaces and edges of the tablet computer. The present teachings further provide a protective cover with an integrated keyboard that can be quickly and easily detached and attached to the tablet computer. Further yet, the present teachings provide a protective cover for a tablet computer that can provide for the tablet computer to be used in a variety of configurations. Still further yet, the present teachings provide a protective cover and integrated keyboard for a tablet computer where the integrated keyboard can be angularly positioned on a support surface. The present teachings provide an improved cover for a tablet computer that is lightweight, can be mass-produced relatively inexpensively, that has a minimal number of parts, and that is easy to operate.

The present teachings provide a protective cover for a tablet computer comprising a back cover and a front cover. The front cover includes an input side and a connector including a planar portion and a coupler for removably connecting the front cover to the back cover. The planar portion engages at least a portion of a front surface of the tablet computer and the coupler engages an edge of the back cover.

The present teachings also provide a protective cover for a tablet computer, comprising a back cover and a front cover. The back cover includes a stand and a rim. The back cover includes an input side, and a connector including a planar portion and a coupler for removably connecting the front cover to the back cover. The stand includes a stand hinge engaging an edge of the rim. The planar portion engages at least a front surface of the tablet computer so that the front cover is angularly oriented relative to a support surface extending below the front cover and the coupler engages the edge of the rim engaged by the stand hinge.

DETAILED DESCRIPTION

Figure 1:
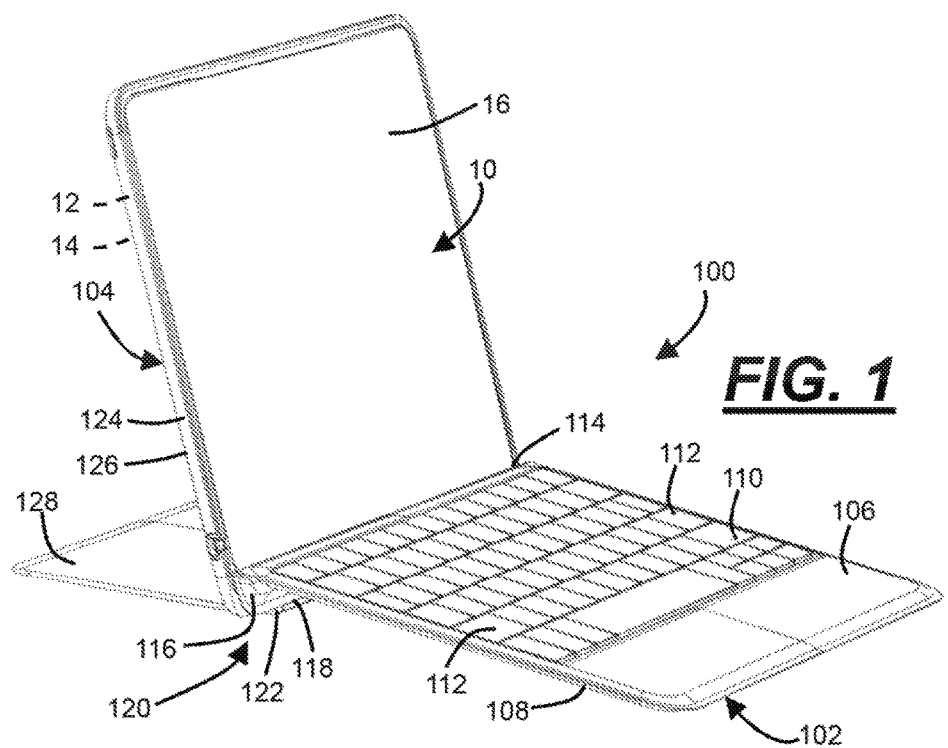
FIG. 1 illustrates a perspective view of the protective cover and a tablet computer according to the teachings herein.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

"Tablet computer" used herein can refer to any electronic device, computer, or multi-media device. Examples of a tablet computer can include, but are not limited to, the Apple iPad® or iPad Air®, the Samsung Galaxy Note®, the Microsoft Surface®, etc. (iPad and iPad Air are trademarks of Apple Inc. Galaxy Note is a trademark of Samsung Electronics Co., Ltd. Microsoft Surface is a trademark of Microsoft Corporation.) The tablet computer may have a screen that can be a touch screen. The tablet computer can have a battery, memory, and a processor with software running thereon. The tablet computer can have WiFi and Bluetooth™ connectivity. The tablet computer can provide internet browsing, data input, game playing, movie and picture display, etc.

The teachings herein provide a protective cover for a tablet computer. The protective cover may function to prevent damage to the tablet computer during storage, transporting, handling, typing, data input, reading, general use, or a combination thereof. The protective cover may function to provide additional grip and/or support during handling, transporting, and/or during general use of the tablet computer. The protective cover may function to position, orientate, hold, stand, support, or a combination thereof the tablet computer in one or more positions or configurations. The protective cover may absorb shock if the tablet computer is dropped. The protective cover may be substantially thin and not add any substantial thickness to the tablet computer. The protective cover may provide an integrated keyboard, which may make typing and or imputing data into the tablet computer easier and less cumbersome. The protective cover may provide an integrated keyboard, which may be easily, selectively detached and attached to the tablet computer. The protective cover may function to provide a detachable keyboard that a user can use in an angular configuration relative to a support surface. The protective cover may function to provide a detachable keyboard that can be folded onto at least a portion of the tablet computer to protect the tablet computer.

Generally, the protective cover may include a back cover and a front cover. The back cover may protect at least a rear or back surface and/or one or more edges of the tablet computer, and the front cover may protect at least a front portion, surface or screen of the tablet computer, or vice versa. The back cover, the front cover, or both may be fabricated from any material suitable for performing the aforementioned functions. Preferably, the back cover, the front cover, or both are fabricated from a lightweight, resilient, and durable material. For example, the back cover, the front cover, or both may be fabricated from one or more materials like plastic, rubber, TPU, polycarbonate, rubber, silicone, leather, and PC+ABS. The back cover, the front cover, or both may be injection molded. The back cover, the front cover, or both may include an underlayment with a skin formed overtop. The back cover, the front cover, or both may function to provide a user with the ability to personalize a tablet computer. For example, the back cover, the front cover, or both may be any color (i.e., red, green, blue, yellow, teal, purple, etc.). Additionally, or alternatively, the back cover, the front cover, or both can include one or more patterns (i.e., stripes, polka dots, stars, herringbone, zig-zags, argyle, checkerboard, plaid, etc.), logos, pictures, etc.

The back cover may include a rim. The rim may function to cover, protect, and/or engage a perimeter of the tablet computer. The rim may function to protect one or more edges of the tablet computer. The rim may resiliently, snugly engage one or more edges of the tablet computer so that the back cover is securely attached to the tablet computer. The rim may have a generally C-shaped or U-shaped cross section. The rim may function to cover, protect, and/or engage at least a portion of a front surface, screen, or both the tablet computer. The rim may include a front undercut surface for engaging at least a portion of the front surface, screen, or both of the tablet computer. The rim may include a line-to-line engagement with an outer portion of the tablet computer, or may be smaller than an outer portion of the tablet computer so that an interference fit between the back cover and the tablet computer can be achieved. The rim may include one or more nubs, projections, ribs, and/or thickened sections that may function to engage the tablet computer via an interference fit.

The back cover may include a stand. The stand may function to support the tablet computer in one or more positions or configurations. Preferably, the stand can move or pivot about one or more stand hinges so that the stand can support the tablet computer in one or more tablet-viewing configurations, one or more tablet-typing configurations, one or more tablet-storage configurations, or a combination thereof. The stand can pivot about the one or more stand hinges so that the stand can be placed into a stowed position. The stand, the stand hinges, or both can be located anywhere on the back cover. Preferably, the stand is connected to an edge of the back cover or rim via one or more stand hinges. The stand hinge may be removably attached to the back cover, the protective cover, or both so that the stand can be separated or detached therefrom. The stand, the stand hinge, or both may be spring-loaded so that when the spring is released, the stand pivots about the stand hinge and retracts away from the back cover. The stand may be magnetically repelled away from the back cover to move the stand from a stowed position into one or more tablet configurations. The stand, the back cover, or both may include one or more legs, grips, gripping feet, anti-skid pads, etc. to prevent the stand, the back cover, the tablet computer, or combination thereof from slipping, sliding, or otherwise moving. The stand may be separable from the protective cover.

A stand recess in the back cover may function to accept at least a portion of the stand when the stand is in a stowed position. Preferably, when the stand is in the stowed position, the stand is generally, substantially flush with a back surface of the back cover. The stand recess may be any cutout, notch, opening, etc. that may accept or receive at least a portion of the stand. In a stowed position, the stand may be locked or secured to the back cover, a stand recess, or both via one or more fasteners, such as one or more hook and loop fasteners, magnets, snap-fits, latches, prongs, knobs, twist locks, etc. A gripping recess may be located near the stand, the stand recess, or both so that a user can easily access the stand to move the stand from a stowed position into one or more of the tablet positions or configurations.

The back cover, the rim, or both may include one or more control openings that may provide access to one or more buttons, controls, or inputs of the tablet computer. The one or more control openings may be any features, recesses, cutouts, openings, slots, apertures, etc. so that access to the one or more buttons, controls, inputs, lights, cameras, flashes, ports, plugs, jacks of the tablet computer is neither restricted nor inhibited. The one or more control openings may include a supporting structure, such as a grommet, for example, to protect the one or more buttons, controls, inputs, lights, cameras, flashes, etc. of the tablet computer. The one or more control openings may also include one or more control buttons. The one or more control buttons may function to provide additional support for manipulating the one or more buttons, controls, or inputs of the tablet computer. For example, the one or more control buttons may be positioned overtop of a volume control, a power button, a dimming feature, etc. of a tablet computer so that a user can easily and effectively manipulate said controls. The one or more control buttons may be fabricated from the same material as the back cover, the front cover, or both, or can be fabricated from a different material. Preferably, the one or more control buttons are fabricated from an elastic, deformable, or rigid material.

The front cover may include an input side. The input side may include an input device. The input device may include a keyboard. The input device may be integrally formed with the front cover, removably attached to the front cover, or permanently attached or integrated with the front cover. The input device may be generally flat and smooth. The input device can include a keypad which can include a standard keypad (i.e. QWERTY keypad), and/or a numeric keypad. The input device may have one or more keys that can be touched by a user. The keys can be touch sensitive. The keys can be physically displaced or provide other feedback to the user's fingers. The input device can include a trackpad. The front cover and/or the input device can include a wireless transmitter for transmitting keystrokes to the tablet computer. The wireless transmitter can use a short-wave radio transmission with the Bluetooth™ standard. The front cover and/or the input device may include a rechargeable battery and a connection port to allow the battery to be recharged or for connecting ancillary devices to the input device, the tablet computer, or both. The front cover and/or the input device may include a light source or indicator, such as an LED, to indicate the power status of the keyboard, and/or to illuminate the keys. When the front cover and input device is detached from the tablet computer, the input device may still be operational so that a user can still perform certain functions, such as input data via keystrokes. The input side of the front cover can be folded over the front surface of screen of the tablet computer in the tablet-storage configuration.

The front cover may include one or more hinges. The one or more hinges may provide for the front cover to move or pivot so that the front cover can engage the back cover, the tablet computer, or both in a variety of configurations. The one or more hinges may bend, flex, move, displace, or a combination thereof so that the front cover can fold upon a front surface or screen of the tablet computer into one or more configurations. (i.e., a tablet-storage configuration), or can fold downwardly away from the front surface or screen of the tablet computer into one or more continuations (i.e., a tablet typing configuration). Preferably, the front cover may include two or more hinges The front cover may include a connector. The connector may function to attach and detach the front cover to/from the back cover, the tablet computer, or both. The connector may include a planar portion and a coupler. The planar portion may engage a front surface or screen of the tablet computer and the coupler may engage the back cover, the rim, or both. The coupler may include one or more coupling features that may removably engage the back cover, the rim, the tablet computer, one or more mating coupling features, or a combination thereof. The one or more coupling features may include any feature that may provide a secure, yet removable connection between the front cover and the back cover, tablet computer, or both. For example, the one or more couplers may include one or more magnets magnetically attracting opposing magnets located in the rim, the back cover, the tablet computer, or a combination thereof; one or more ribs or projections engaging one or more mating notches or grooves (i.e., via an interference fit) in the rim, the back cover, the tablet computer, or a combination thereof, or vice versa. It is envisioned that the one or more coupling features may also include one or more quick connect features, hook and loop fasteners, detents, etc.

The protective cover and the tablet computer can be used in one or more configurations. For example, the tablet computer can be used in one or more tablet-typing configurations where the front cover, the tablet computer, or both are angularly oriented relative to a support surface. For example, in one or more tablet-typing configurations, the front cover can form an angle with the support surface on the order of about 5 degrees or more, 10 degrees or more, 15 degrees or more, or about 25 degrees or more. In the one or more tablet-typing configurations, the front cover can form an angle with the support surface on the order of about 40 degrees or less, about 30 degrees or less, about 20 degrees or less, about 10 degrees or less, or even about 5 degrees or less. In the one or more tablet-typing configurations, the tablet computer, the back cover, or both can form an angle with a plane extending generally perpendicular to the support surface on the order of about 0 degrees or more, about 5 degrees or more, about 15 degrees or more, about 20 degrees or more, about 30 degrees or more, about 45 degrees or more, or about 60 or more, or even about 70 degrees or more. In the one or more tablet-typing configurations, stand can form an angle with a plane extending generally perpendicular to the support surface on the order of about 0 degrees or more, about 1 degrees or more, or even about 5 degrees or more.

In the tablet-storage configuration, the input side of the front cover can be folded over the front surface of screen of the tablet computer. In the tablet-storage configuration, the front surface or screen of the tablet can be at least partially covered by the front cover, but is preferably fully covered by the front cover.

In the one or more tablet-viewing configurations, the front cover can be removed from the back cover, the tablet computer, or both. In the one or more tablet-viewing configurations, an angle of the tablet computer relative to a support surface or an axis extending generally perpendicular to the support surface can be adjusted any desired angle by moving or adjusting the tablet computer, the stand, or both via the stand hinges. For example, in the one or more tablet-viewing configurations, an angle of the tablet computer relative to an axis extending generally perpendicular to the support surface can be on the order of about 0 degrees or more, about 10 degrees or more, about 20 degrees or more, about 45 degrees or more, about 60 degrees or more, or even 80 degrees or more. In fact, the angle of the tablet computer relative to the axis extending generally perpendicular to the support surface in the one or more tablet-viewing configurations can be any angle providing that the stand, the stand hinges, or both can maintain the weight of the tablet computer. Accordingly, in the one or more tablet-viewing configurations, an angle between the stand and the tablet computer can be any desired angle.

FIG. 1 illustrates a perspective view of the protective cover 100 and tablet computer 10. The protective cover 100 generally includes a front cover 102 and a back cover 104. The front cover 102 generally includes an input side 106 and an opposing outer side 108. The input side 106 includes an input device 110 with one or more keys 112 for communicating with the tablet computer 10. The front cover 102 also includes a first hinge 114, a second hinge 118, and a connector 120 including a planar portion 116 and a coupler 122 (See also FIG. 2). As perhaps best illustrated in FIG. 2, the coupler 122 includes one or more coupling features 123 (not shown) that can removebly engage or attach to the back cover 104, a rim 124, the tablet computer 10, or one or more mating coupling features (not shown) on back cover 104, rim 124, tablet computer 10, or a combination thereof. The first hinge 114 and the second hinge 118 can each move and/or bend and, together with the connector 120, can provide for orienting the tablet computer 10 in one or more of the tablet configurations 140, 142, 144, 146, 148, 150 (not shown) described herein. The planar portion 116 can engage or contact at least a portion of a front surface 16 or screen of the tablet computer 10.

The back cover 104 generally includes edges or a rim 124, a back surface 126, and a stand 128. The rim 124 can snuggly surround one or more edges 12 of the tablet computer 10 and at least a portion of the back surface 14 of the tablet computer 10. The rim 124 can also engage at least a portion of a front surface 16 of the tablet 10. In other words, the tablet computer 10 is secured in the back cover 104 by virtue of a resilient tension applied by the rim 124 and the back surface 126 against the edges 12, the back surface 14, and a least a portion of the front surface 16 of the tablet computer 10. The back cover 104, the back surface 126, the rim 124, or a combination thereof can include one or more mating coupling features (not shown) that can be engaged by one or more of the coupling features 123 (also not shown) on the front cover 102. The stand 128 can support the tablet computer 10 and includes a stand hinge 130 (not shown; See FIG. 3), which can provide for supporting and orienting the tablet computer 10 in one or more of the tablet configurations described herein.

Figure 2:
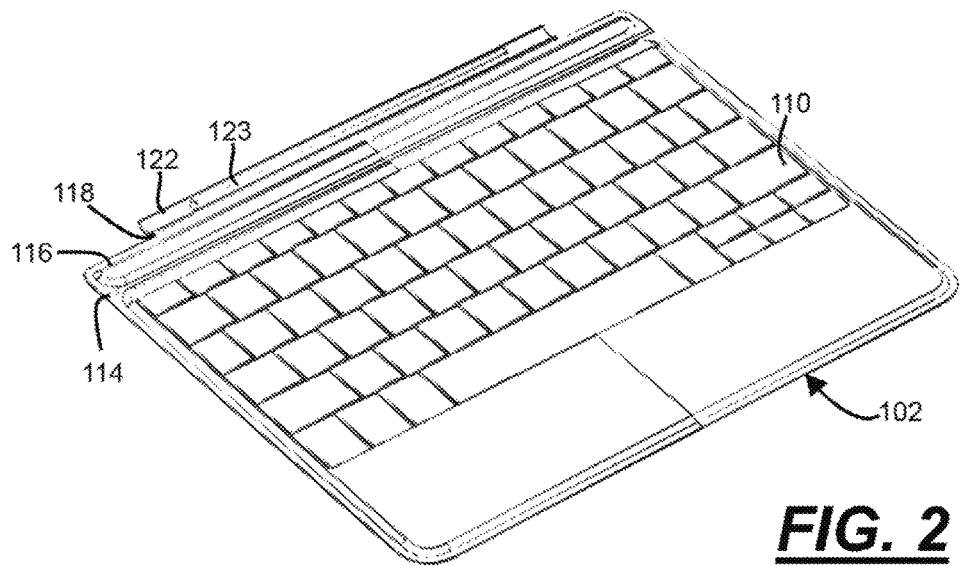
FIG. 2 illustrates a perspective view of a portion of the protective cover according to the teachings herein.

FIG. 2 illustrates a perspective view of the front cover 102. The front cover 102 is shown separated from the back cover 104 and the tablet computer 10 (neither shown). The first hinge 114 is between the input device 110 and the planar portion 116, and the second hinge 118 is between the planar portion 116 and the coupler 122. The coupler 122 includes one or more coupling features 123 that can engage mating coupling features (not shown) on the back cover 104, the rim 124, or the tablet computer 10 to removably connect the front cover 102 to the back cover 104 or tablet computer 10. The one or more coupling features 123 can be any feature that can perform the aforementioned functions. For example, the one or more coupling features 123 can be one or more magnets engaging one or more opposing magnets; one or more ribs or projections engaging mating notches or channels (e.g., via an interference fit, for example); one or more hook fasteners engaging mating loop fasteners; or a combination thereof.

Figure 3:
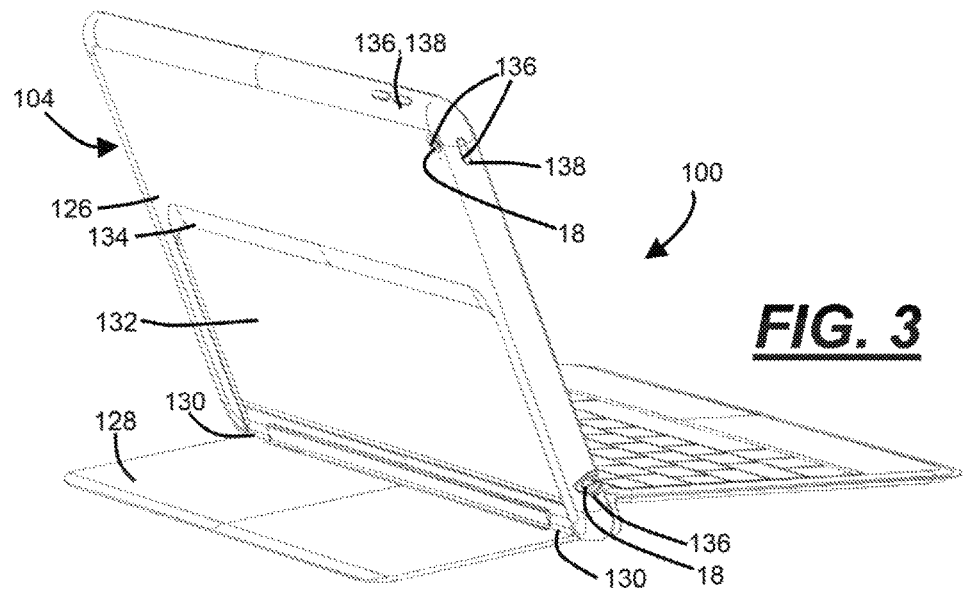
FIG. 3 illustrates a perspective view of the protective cover and a tablet computer according to the teachings herein.

FIG. 3 illustrates another perspective view of the protective cover 100. The stand 128 is moveably connected to the back cover 104 via the stand hinge 130. The back cover 104 also includes a stand recess 132 for receiving the stand 128 when the stand 128 is pivoted into a stowed position 152 (not shown; See FIG. 10). It is contemplated that when the stand 128 is pivoted about the stand hinge 130 into the stowed position 152, the stand 128 is substantially flush with the back surface 126 of the back cover 104. The back cover 104 also includes a gripping recess 134 and a plurality of control openings 136. The gripping recess 134 can provide for a user to easily grasp and move the stand 128 from the stowed position 152 to one or more of the tablet configurations described herein. The plurality of control openings 136 can provide access to various tablet controls or inputs 18. For example, the control features 136 can provide access to on or more plugs, ports, jacks, slots, buttons, cameras, lights, flashes, etc. so that the protective cover 100 does not impede function thereof. One or more of the control openings 136 can include one or more buttons 138, which may assist a user in operating the tablet computer 10. For example, the buttons 138 may be used with the control openings 136 to manipulate the tablet volume adjustment buttons and/or the tablet power button.

Figure 4:
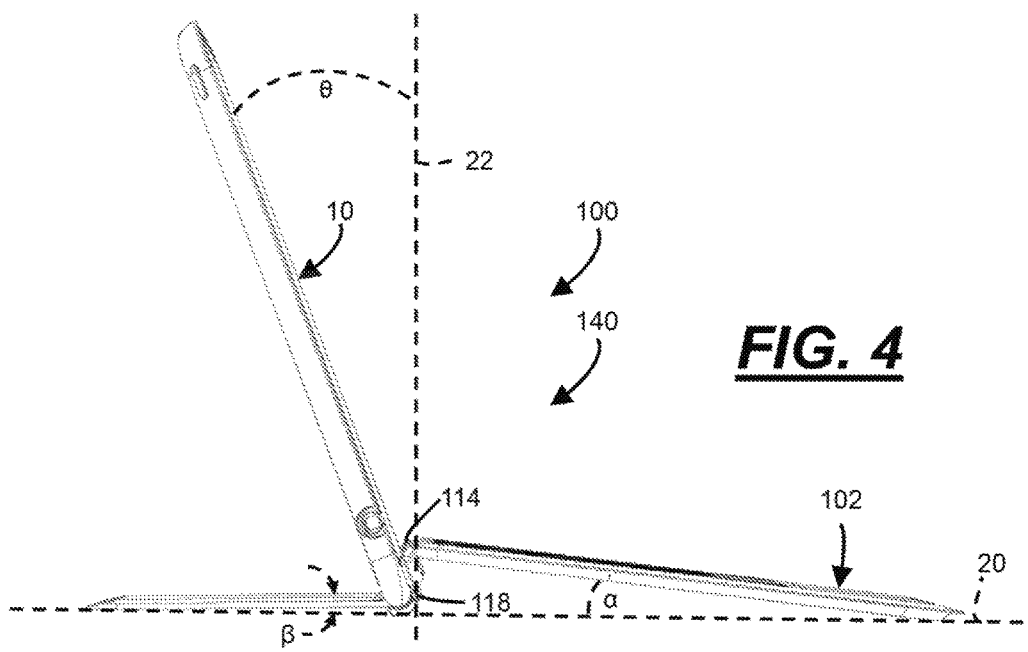
FIG. 4 illustrates a side view of the protective cover and a tablet computer according to the teachings herein.

FIG. 4 illustrates a side view of the protective cover 100 engaging the tablet computer 10 in a tablet-typing configuration 140 (See also FIGS. 1 and 3). In the tablet-typing configuration 140, the first and second hinges 114, 118 bend so that the front cover 102 forms an angle α with a support surface 20; the stand 128 forms an angle β with the support surface 20; and the tablet computer 10 forms an angle θ with an axis 22 extending generally perpendicular to the support surface 20. Depending on user preference, for example, one or more of the angles α, β, θ can be moved or adjusted by moving or adjusting the first hinge 114, the second hinge 118, or both. This may be done by angling or moving the tablet computer 10 relative to the vertical axis 22, and/or by adjusting the stand 128 via the stand hinge 130. In the tablet-typing configuration 140, the coupler 122 is substantially perpendicular to the planar portion 116.

Figure 5:
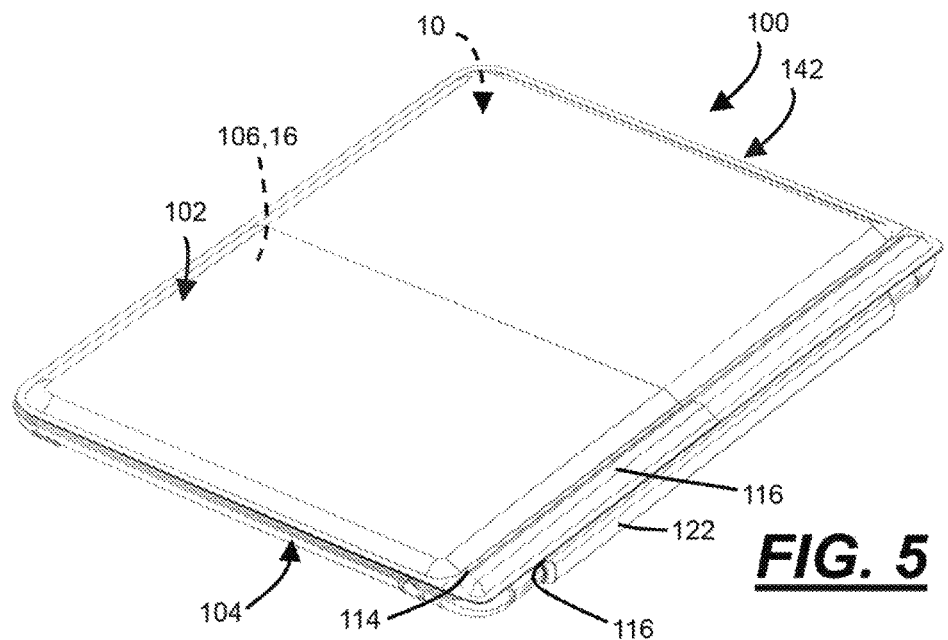
FIG. 5 illustrates a perspective view of the protective cover and a tablet computer according to the teachings herein.

FIG. 5 illustrates a perspective view of the protective cover 100 engaging the tablet computer 10 in a tablet-storage configuration 142. In the tablet-storage configuration 142, the front cover 102 covers some or all of the front surface 16 of the tablet computer 10, and the back cover 104 substantially engages the tablet 10. In the tablet-storage configuration 142, the first and second hinges 114, 116 are moved and bent so that the input side 106 of the front cover 102 faces the front surface 16 of the tablet computer 10. In addition, in the tablet-storage configuration 142, the coupler 122 is substantially perpendicular to the planar portion 116.

Figure 6:
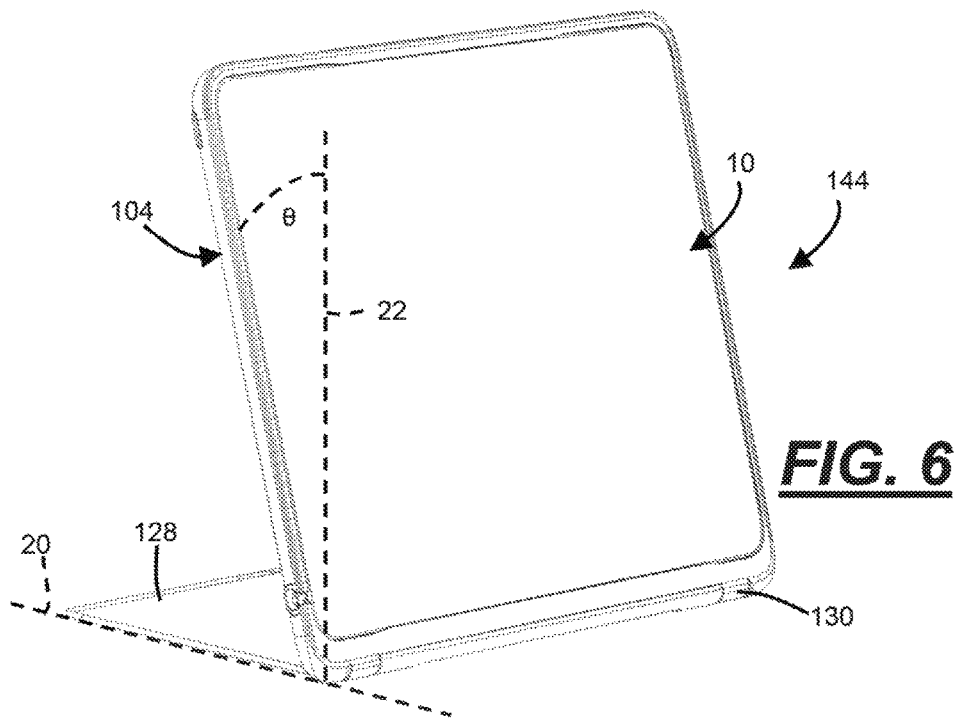
FIG. 6 illustrates a perspective view of a portion of the protective cover and a tablet computer according to the teachings herein.

FIG. 6 illustrates a perspective view of the back cover 104 engaging the tablet computer 10 in a first tablet-viewing configuration 144. The first tablet-viewing configuration 144 may be substantially similar to the typing configuration 140 shown in FIGS. 1, 3 and 4, save for the front cover 102 (not shown) is disconnected from the back cover 104 and tablet computer 10. In the first tablet-viewing configuration 144, the stand 128 can be substantially parallel to the support surface 20, and the tablet computer 10 can form an angle θ with the axis 22 extending generally perpendicular to the support surface 20. Depending on user preference, the angle θ can be adjusted by moving the tablet computer 10 and back cover 104 relative to the stand 128 via the stand hinge 130.

Figure 7:
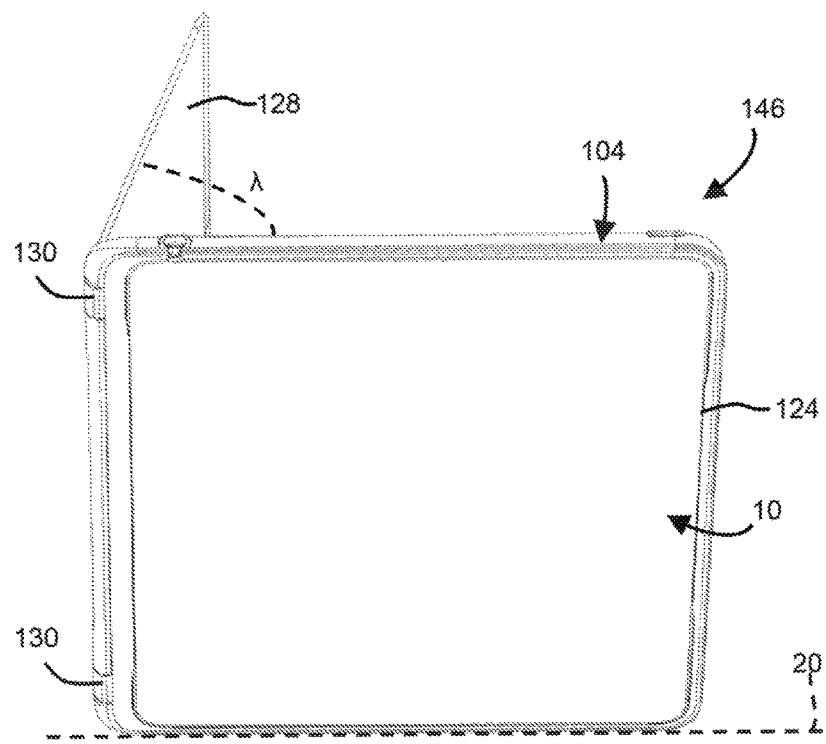
FIG. 7 illustrates a perspective view of a portion of the protective cover and a tablet computer according to the teachings herein.

FIG. 7 illustrates a perspective view of the back cover 104 engaging the tablet computer 10 in a second tablet-viewing configuration 146. The second tablet-viewing configuration 146 may be substantially similar to the first tablet-viewing configuration 144 (FIG. 6), save for both the stand 128 and an edge of the rim 124 contact the support surface 20. An angle λ between the stand 128 and the back cover 104 can be adjusted via the stand hinge 130.

Figure 8:
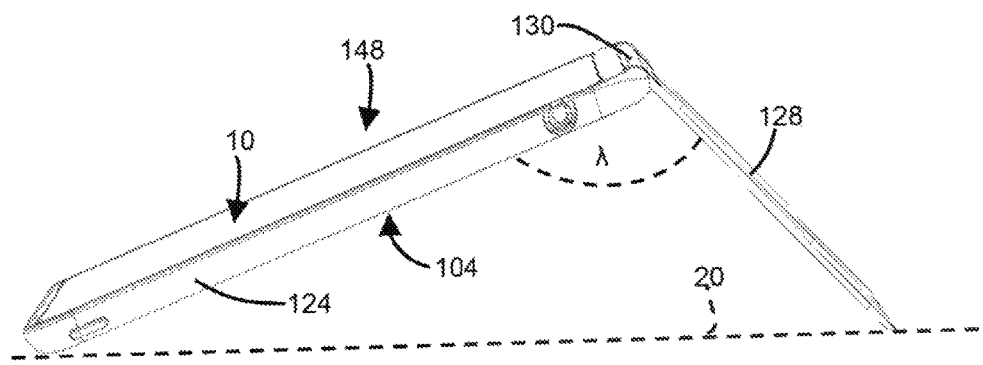
FIG. 8 illustrates a side view of a portion of the protective cover and a tablet computer according to the teachings herein.

FIG. 8 illustrates a perspective view of the back cover 104 engaging the tablet computer 10 in a third tablet-viewing configuration 148. In the third tablet-viewing configuration 148, the stand 128 and an edge of the rim 124 contact the support surface 20. An angle λ between the stand 128 and the back cover 104 can be adjusted via the stand hinge 130.

Figure 9:
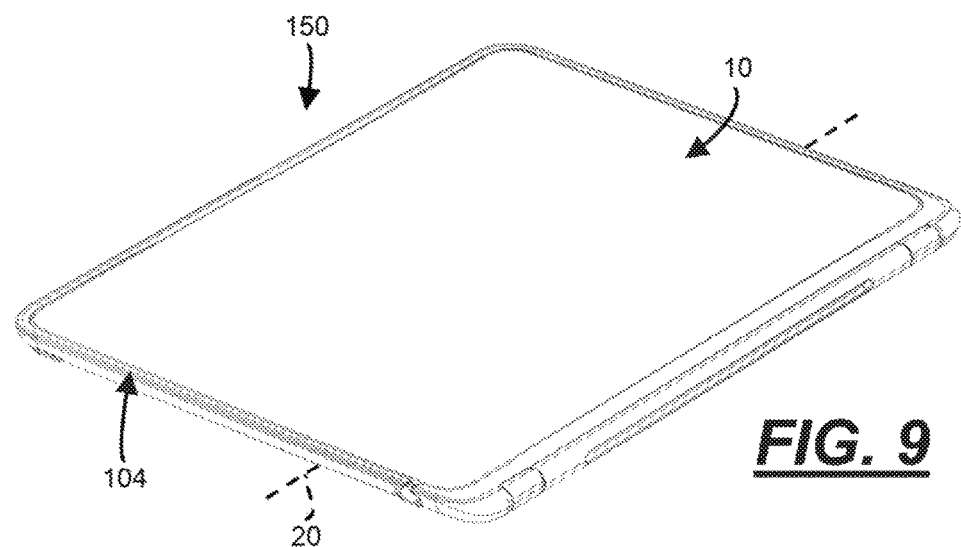
FIG. 9 illustrates a perspective view of a portion of the protective cover and a tablet computer according to the teachings herein.

FIG. 9 illustrates a perspective view of the back cover 104 engaging the tablet computer 10 in a fourth tablet-viewing configuration 150. In the fourth tablet-viewing configuration 150, the front cover 102 (not shown) is disconnected from the back cover 104 and tablet computer 10. In fourth tablet-viewing configuration 150, the stand 128 (not shown) can be received in the stand recess 132 (not shown) so that the tablet computer 10 can lay substantially flat on the support surface 20.

Figure 10:
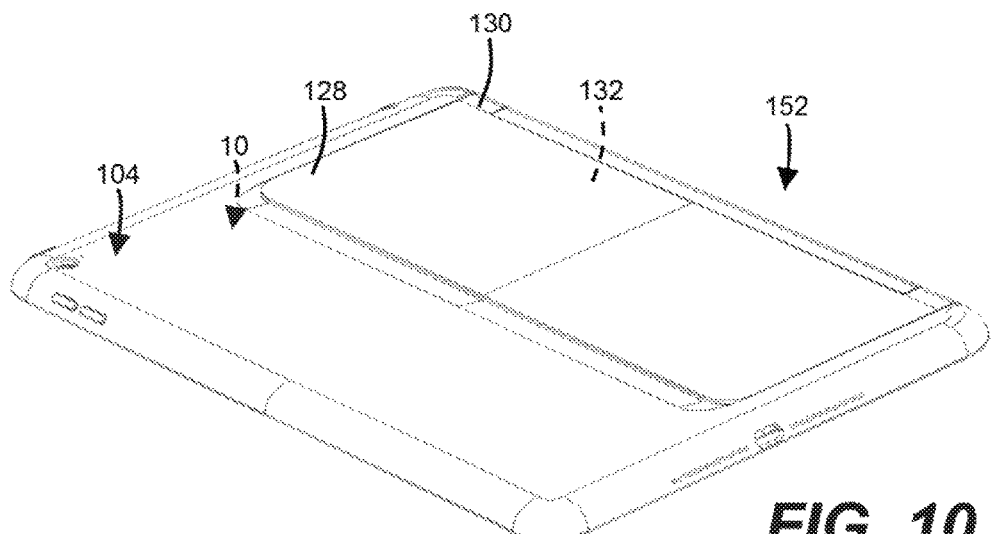
FIG. 10 illustrates a perspective view of a portion of the protective cover and a tablet computer according to the teachings herein.

FIG. 10 illustrates a perspective view of the back cover 104 engaging the tablet computer 10. In the stowed position 152, the stand 128 is folded about the stand hinge 130 into the stand recess 132 so that the stand 128 is substantially flush with the back cover 104.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thu-s, "about 20 to 30" is intended to cover "about 20 to about 30", inclusive of at least the specified endpoints.

The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

The omission in the following claims of any aspect of subject matter that is disclosed herein is not a disclaimer of such subject matter, nor should it be regarded that the inventors did not consider such subject matter to be part of the disclosed inventive subject matter.

10 tablet computer
  12 edges of tablet 10
  14 back surface of tablet 10
  16 front surface of tablet 10
  18 controls or inputs on tablet 10
  20 support surface
  22 axis extending substantially perpendicular o the support surface 20
  100 protective cover
  102 front cover
  104 back cover
  106 input side
  108 outer side
  110 input device of input side 106 of front cover 102
  112 keys of input device 110
  114 first hinge
  116 planar portion of connector 120
  118 second hinge
  120 connector
  122 coupler of connector 120
  123 coupling features of coupler 122
  124 rim of back cover 104
  126 back surface of back cover 104
  128 stand
  130 stand hinge
  132 stand recess for receiving stand 128 in a tablet-storage configuration 142
  134 gripping recess
  136 control openings
  138 control buttons
  140 tablet-typing configuration
  142 tablet-storage configuration
  144 first tablet-viewing configuration
  146 second tablet-viewing configuration
  148 third tablet-viewing configuration
  150 fourth tablet-viewing configuration
  152 stowed position stand 128
  α angle of front cover 102 relative to support surface 20
  β angle of stand 128 relative to support surface 20
  θ angle of back cover 104/tablet 10 relative to axis 22
  λ angle between the stand 128 and the back cover 104

We claim:

1. A protective cover for a tablet computer, comprising:
  a back cover comprising:
    a back surface having a first side and a second side, the second side comprising a stand recess;
    a rim extending from and around the perimeter of the first side of the back surface, the rim being configured to snugly retain the tablet computer against the back surface;

a stand pivotably connected to the back cover by one or more stand hinges positioned along the rim, the stand being configured to support the back cover on a support surface;
wherein the stand is positioned and configured to support the back cover when the stand is pivoted to a plane parallel to the support surface; and
wherein when the stand is in a stowed position, the stand is substantially flush with the second side of the back surface; and
a removable front cover comprising:
an input side comprising a keyboard,
a connector for removably connecting to the back cover; and
at least one articulation point enabling the front cover to bend between the input side and the connector;
wherein when the connector connects to the back cover, the articulation point of the front cover is positioned higher above the support surface than the edge of the input side furthest from the connector, and the input side is positioned at an angle relative to the support surface.

2. The protective cover of claim 1, wherein the connector of the front cover comprises one or more magnets, the back cover further comprises one or more opposing magnets, and the magnets of the connector are attracted to the opposing magnets of the back cover, removably connecting the front cover to at least a portion of the back cover.

3. The protective cover of claim 1, wherein the stand hinge is removably attached to the back cover.

4. The protective cover of claim 1, wherein the stand hinge is positioned along the same edge of the back cover that connects to the connector of the front cover.

5. A protective cover for a tablet computer, comprising:
a back cover comprising:
a back surface having a first side and a second side;
a rim extending from and around the perimeter of the first side of the back surface, the rim being configured to snugly retain the tablet computer against the back surface; and
a stand pivotably connected to the back cover by one or more stand hinges positioned along the rim, the stand being configured to support the back cover on a support surface; and
a removable front cover comprising:
an input side, and
a connector for removably connecting to the back cover.

6. The protective cover of claim 5, wherein the front cover further comprises at least one articulation point enabling the front cover to bend between the input side and the connector.

7. The protective cover of claim 6, wherein when the connector connects to the back cover, the articulation point of the front cover is positioned higher above the support surface than the edge of the input side furthest from the connector, and the input side is positioned at an angle relative to the support surface.

8. The protective cover of claim 7, wherein the stand hinge is positioned along the same edge of the back cover that connects to the connector of the front cover.

9. The protective cover of claim 5, wherein the stand is positioned and configured to support the back cover when the stand is pivoted to a plane parallel to the support surface.

10. The protective cover of claim 9, wherein the second side of the back surface further comprises a stand recess, and wherein when the stand is in a stowed position, the stand is substantially flush with the second side of the back surface.

11. The protective cover of claim 5, wherein the stand is positioned and configured to support the back cover when the stand is pivoted to a plane parallel to the support surface.

12. The protective cover of claim 11, wherein the second side of the back surface further comprises a stand recess, and wherein when the stand is in a stowed position, the stand is substantially flush with the second side of the back surface.

13. The protective cover of claim 5, wherein the connector includes one or more coupling features removably connecting the front cover to at least a portion of the back cover.

14. The protective cover of claim 13, wherein the coupling features of the front cover comprise one or more magnets, the back cover further comprises one or more opposing magnets, and the magnets of the connector are attracted to the opposing magnets of the back cover.

15. The protective cover of claim 5, wherein the stand hinge is removably attached to the back cover, allowing the stand to be removed from the back cover.

16. The protective cover of claim 5, wherein the stand hinge is positioned along the same edge of the back cover that connects to the connector of the front cover.

17. The protective cover of claim 5, wherein the input side includes a keyboard.

18. The protective cover of claim 5, wherein the input side includes a touchpad.

19. A protective cover for a tablet computer, comprising:
a back cover comprising:
a back surface having a first side and a second side;
a rim extending from and around the perimeter of the first side of the back surface, the rim being configured to snugly retain the tablet computer against the back surface;
a stand pivotably connected to the back cover by one or more stand hinges positioned along the rim, the stand being configured to support the back cover on a support surface; and
wherein the stand is positioned and configured to support the back cover when the stand is pivoted to a plane parallel to the support surface; and
a removable front cover comprising:
an input side comprising a keyboard,
a connector for removably connecting to the back cover; and
at least one articulation point enabling the front cover to bend between the input side and the connector.

20. The protective cover of claim 19, wherein when the connector connects to the back cover, the articulation point of the front cover is positioned higher above the support surface than the edge of the input side furthest from the connector, and the input side is positioned at an angle relative to the support surface.

* * * * *